United States Patent
Kielar et al.

[19]

[11] Patent Number: 6,039,143
[45] Date of Patent: Mar. 21, 2000

[54] STEERABLE DRIVE AXLE WITH ELECTRICALLY-POWERED STEERING APPARATUS

[75] Inventors: Stanley John Kielar, Saginaw; Kenneth Lee Westercamp, Frankenmuth; Chad David Bauer, Hemlock, all of Mich.

[73] Assignee: General Motors Corporation, Detroit, Mich.

[21] Appl. No.: 08/867,643

[22] Filed: Jun. 2, 1997

[51] Int. Cl.[7] .................................................. B62D 5/04
[52] U.S. Cl. ........................ 180/412; 180/253; 180/375; 180/444; 180/445
[58] Field of Search .................................. 180/443, 444, 180/445, 446, 252, 253, 254, 255, 256, 257, 258, 264, 265, 266, 267, 412, 413, 374, 375, 378, 234

[56] References Cited

U.S. PATENT DOCUMENTS

| | | | |
|---|---|---|---|
| 1,367,616 | 2/1921 | Martinson | 180/375 |
| 2,503,477 | 4/1950 | Gregory | 180/258 |
| 3,048,232 | 8/1962 | O'Brien | 180/254 |
| 3,805,910 | 4/1974 | Hull | 180/79.2 R |
| 4,102,427 | 7/1978 | Sabec | 180/156 |
| 4,175,638 | 11/1979 | Christenson | 180/140 |
| 4,536,003 | 8/1985 | Maurer et al. | 280/95 R |
| 4,545,458 | 10/1985 | Jones | 180/255 |
| 4,592,440 | 6/1986 | Ujita et al. | 180/155 |
| 4,694,925 | 9/1987 | Roberts | 180/444 |
| 4,718,686 | 1/1988 | Dziuba et al. | 280/95 R |
| 4,753,308 | 6/1988 | Noto et al. | 180/446 |
| 4,768,796 | 9/1988 | Tashiro et al. | 280/91 |
| 4,802,546 | 2/1989 | Sakikawa et al. | 180/132 |
| 4,936,401 | 6/1990 | Baraszu et al. | 180/79.1 |
| 4,941,543 | 7/1990 | Ewen | 180/254 |
| 4,967,859 | 11/1990 | Tomlinson | 180/79.1 |
| 5,010,488 | 4/1991 | Ohshita et al. | 364/424.05 |
| 5,012,885 | 5/1991 | Hilden | 180/254 |
| 5,129,474 | 7/1992 | Rauter et al. | 180/156 |
| 5,129,477 | 7/1992 | Hurlburt | 180/265 |
| 5,476,276 | 12/1995 | Hurlburt | 180/266 |
| 5,489,114 | 2/1996 | Ward et al. | 280/638 |

*Primary Examiner*—Anne Marie Boehler
*Attorney, Agent, or Firm*—Edmund P Anderson

[57] ABSTRACT

A steerable drive axle for a motor vehicle including a rigid tubular housing, a pair of steering knuckles at opposite ends of the rigid tubular housing, an expanded chamber in the middle of the rigid tubular housing open on one side for access to a differential gear set in the expanded chamber, a differential cover for closing the open side of the expanded chamber, and an electrically-powered steering apparatus on the cover linked to the steering knuckles. The electrically-powered steering apparatus includes a rack bar passage in the differential cover, a rack bar supported in the rack bar passage for linear translation and linked to the steering knuckles, a pinion head rotatably supported on the differential cover having a pinion gear meshing with a rack gear on the rack bar, an electric motor mounted on the differential cover, and a speed reducer on the differential cover between the pinion head and an output shaft of the electric motor. In a preferred embodiment, the speed reducer consists of a pair of planetary gear sets affording double reduction torque multiplication between the electric motor and the pinion head.

9 Claims, 4 Drawing Sheets

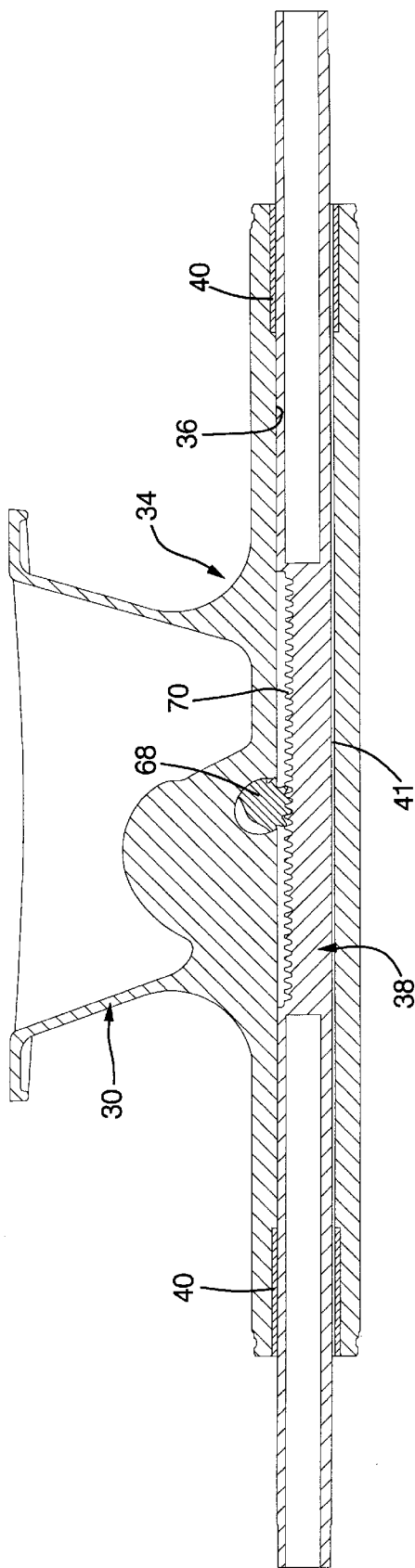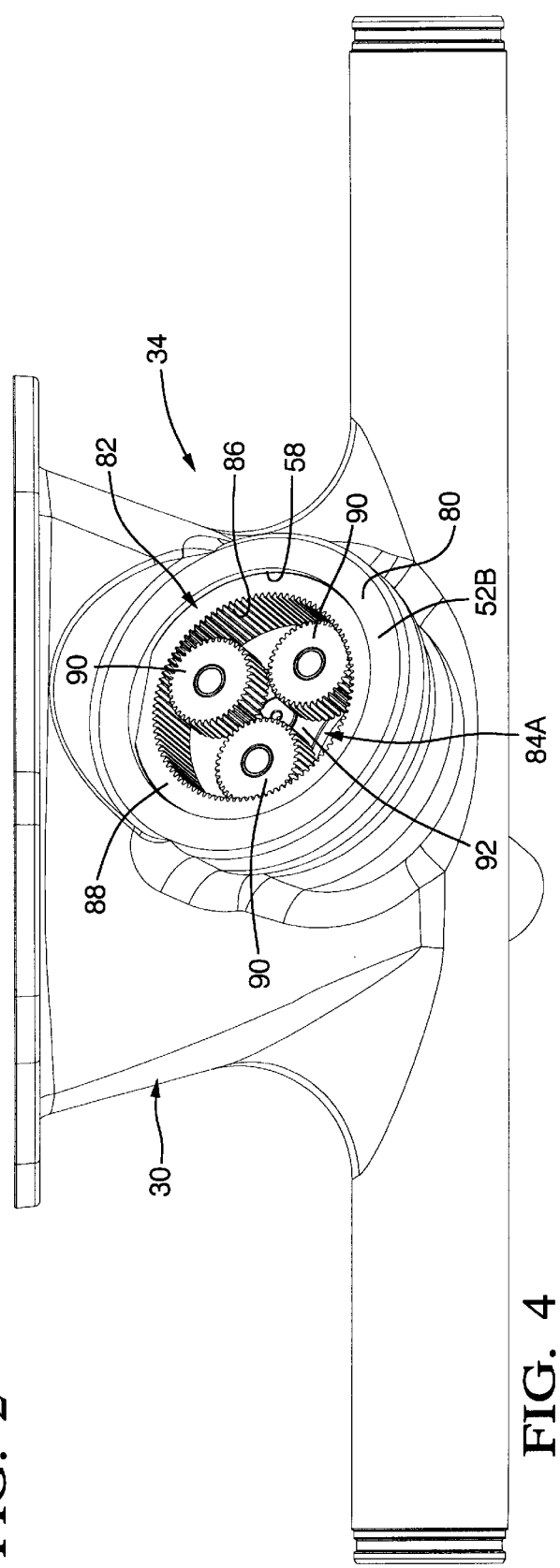
FIG. 2
FIG. 4

STEERABLE DRIVE AXLE WITH ELECTRICALLY-POWERED STEERING APPARATUS

TECHNICAL FIELD

This invention relates to a steerable drive axle for a motor vehicle.

BACKGROUND OF THE INVENTION

A drive axle for a motor vehicle commonly includes a rigid tubular housing, a pair of dirigible wheels rotatably supported on the rigid tubular housing at opposite ends thereof, a pair of axle shafts in the rigid tubular housing connected to the dirigible wheels, and a differential in an expanded chamber in the middle of the tubular housing which distributes drive torque from a drive shaft to each of the axle shafts. Such drive axles are referred to as steerable when they further include steering knuckles between the ends of the rigid tubular housing and corresponding ones of the dirigible wheels, a pair of axle shafts with universal joints to transfer the torque while turning, and a steering apparatus which pivots to the steering knuckles in unison about respective ones of a pair of steering axes of the rigid tubular housing. A steering apparatus on a drive axle described in U.S. Pat. No. 4,592,440, for example, includes a steering assist fluid motor on a cover over the expanded chamber in the middle of the rigid tubular housing of the drive axle. The fluid motor includes a cylinder attached to or integral with the cover and a piston in the cylinder linked to the steering knuckles such that linear translation of the piston in the cylinder induced by differential fluid pressure across the piston effects corresponding pivotal movement in unison of the steering knuckles about the steering axes. A steerable drive axle according to this invention is a novel alternative to the steerable drive axle described in the aforesaid U.S. Pat. No. 4,592,440.

SUMMARY OF THE INVENTION

This invention is a new and improved steerable drive axle for a motor vehicle including a rigid tubular housing, a pair of steering knuckles at opposite ends of the rigid tubular housing pivotable about respective ones of a pair of steering axes of the latter, an expanded chamber in the middle of the rigid tubular housing open on one side for access to a differential gear set in the expanded chamber, a differential cover for closing the open side of the expanded chamber, and an electrically-powered steering apparatus integral with the cover linked to the steering knuckles. The electrically-powered steering apparatus includes a rack bar passage in the differential cover, a rack bar supported in the rack bar passage for linear translation in the length direction of the rack bar passage, a pinion head rotatably supported on the differential cover having a pinion gear meshing with a rack gear on the rack bar, an electric motor mounted on the differential cover, and a speed reducer on the differential cover between the pinion head and an output shaft of the electric motor. In a preferred embodiment, the speed reducer consists of a first planetary gear set having an input through a sun gear rotatable as a unit with the output shaft of the electric motor and an output through a planet carrier and a second planetary gear set having an input through a sun gear rotatable as a unit with the planet carrier of the first planetary gear set and an output through a planet carrier rotatable as a unit with the pinion head.

BRIEF DESCRIPTION OF THE DRAWINGS

FIG. 2 is an enlarged sectional view taken generally along the plane indicated by lines 2—2 in FIG. 1;

FIG. 4 is a fragmentary perspective view of a differential cover of the steerable drive axle according to this invention.

DESCRIPTION OF THE PREFERRED EMBODIMENT

Figure 1:
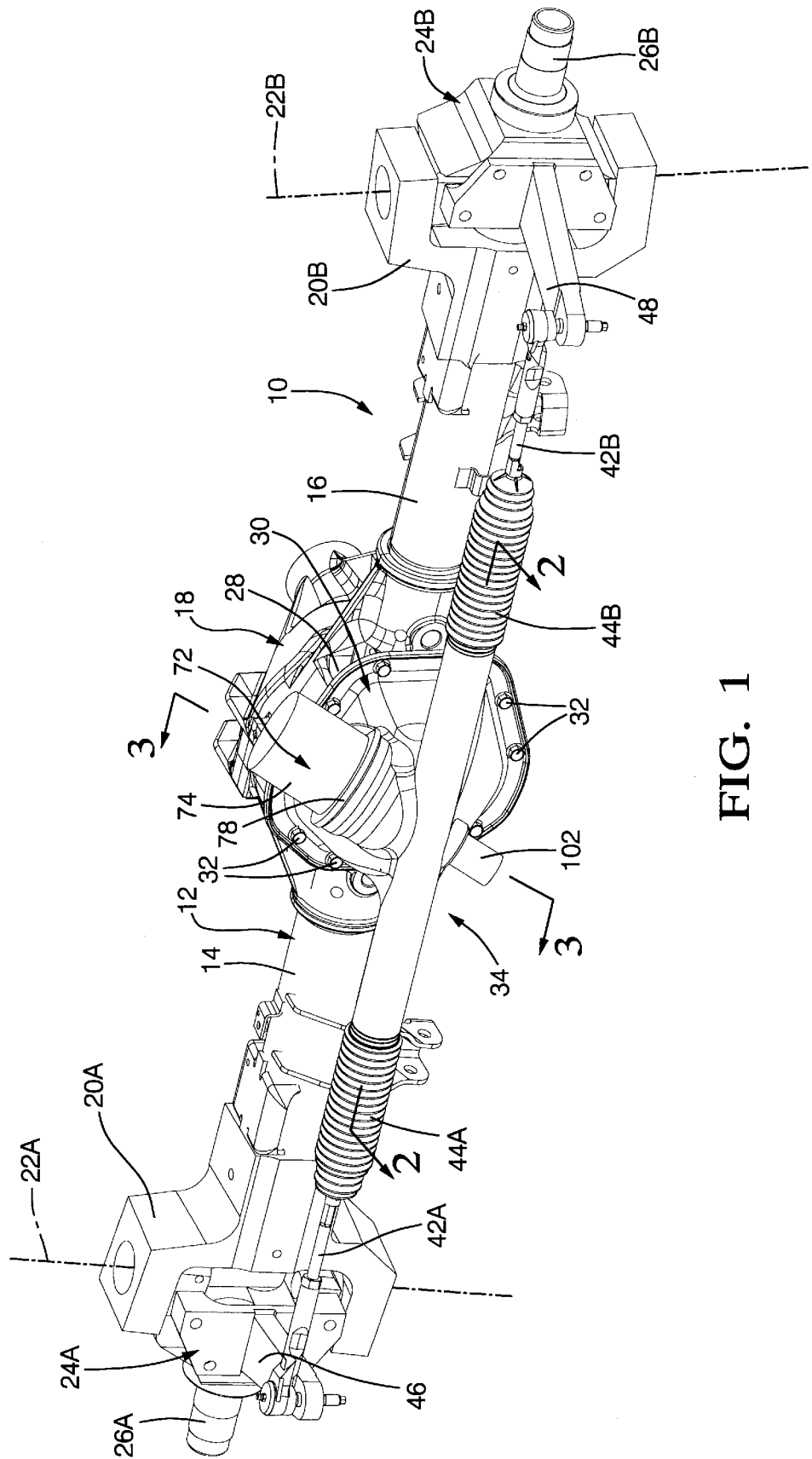
FIG. 1 is a perspective view of a steerable drive axle according to this invention.

Referring to FIG. 1, a steerable drive axle 10 according to this invention for a motor vehicle, not shown, includes a rigid tubular housing 12 consisting of a pair of tubes 14, 16 and a differential carrier 18 between the tubes. A pair of fork-shaped brackets 20A, 20B are rigidly attached to the tubes 14, 16 at outboard ends thereof and define a pair of steering axes 22A, 22B of the rigid tubular housing. A pair of steering knuckles 24A, 24B are supported on the fork-shaped brackets 20A, 20B, respectively, for pivotal movement about respective ones of the pair of steering axes 22A, 22B. A pair of wheel spindles 26A, 26B are rotatably supported on the steering knuckles 24A, 24B, respectively, and a pair of dirigible wheels, not shown, are connected to respective ones of the wheel spindles for rotation as a unit with the latter.

The interior of the differential carrier 18 constitutes an expanded chamber of the rigid tubular housing 12 in which is disposed a differential gear set for distributing torque from an input shaft, not shown, to a pair of axle shafts, not shown, in the tubes 14, 16 connected to respective ones of the wheel spindles 26A, 26B. An open side 28 of the expanded chamber defined by the interior of the differential carrier affords access to the differential gear set therein and is sealed shut by a differential cover 30 rigidly fastened to the differential carrier 18 by a plurality of bolts 32.

An electrically-powered steering apparatus 34 on the steerable drive axle 10 includes a rack bar passage 36 in the differential cover 30 and a rack bar 38 supported in the rack bar passage by a pair of sleeve bearings 40 for back and forth linear translation in the length direction of the rack bar passage. The sleeve bearings 40 provide a clearance 41 between the rack bar 38 and the rack bar passage 36, illustrated in exaggerated fashion in FIGS. 3–4, which accommodates resilient flexure of the rack bar in leaf spring fashion between the sleeve bearings. An inboard end, not shown, of each of a pair of tie rods 42A, 42B of the electrically-powered steering apparatus 34 is articulated to a corresponding end of the rack bar 38 and protected against contamination by a corresponding one of a pair of flexible boots 44A, 44B. An outboard end of the tie rod 42A is articulated to a lever arm 46 of the steering knuckle 24A. An outboard end of the tie rod 42B is articulated to a lever arm 48 of the steering knuckle 24B. The tie rods 42A, 42B cooperate with the lever arms 46, 48 in converting back and forth linear translation of the rack bar 38 into pivotal movement in unison of the steering knuckles 24A, 24B about corresponding ones of the steering axes 22A, 22B.

Figure 3:
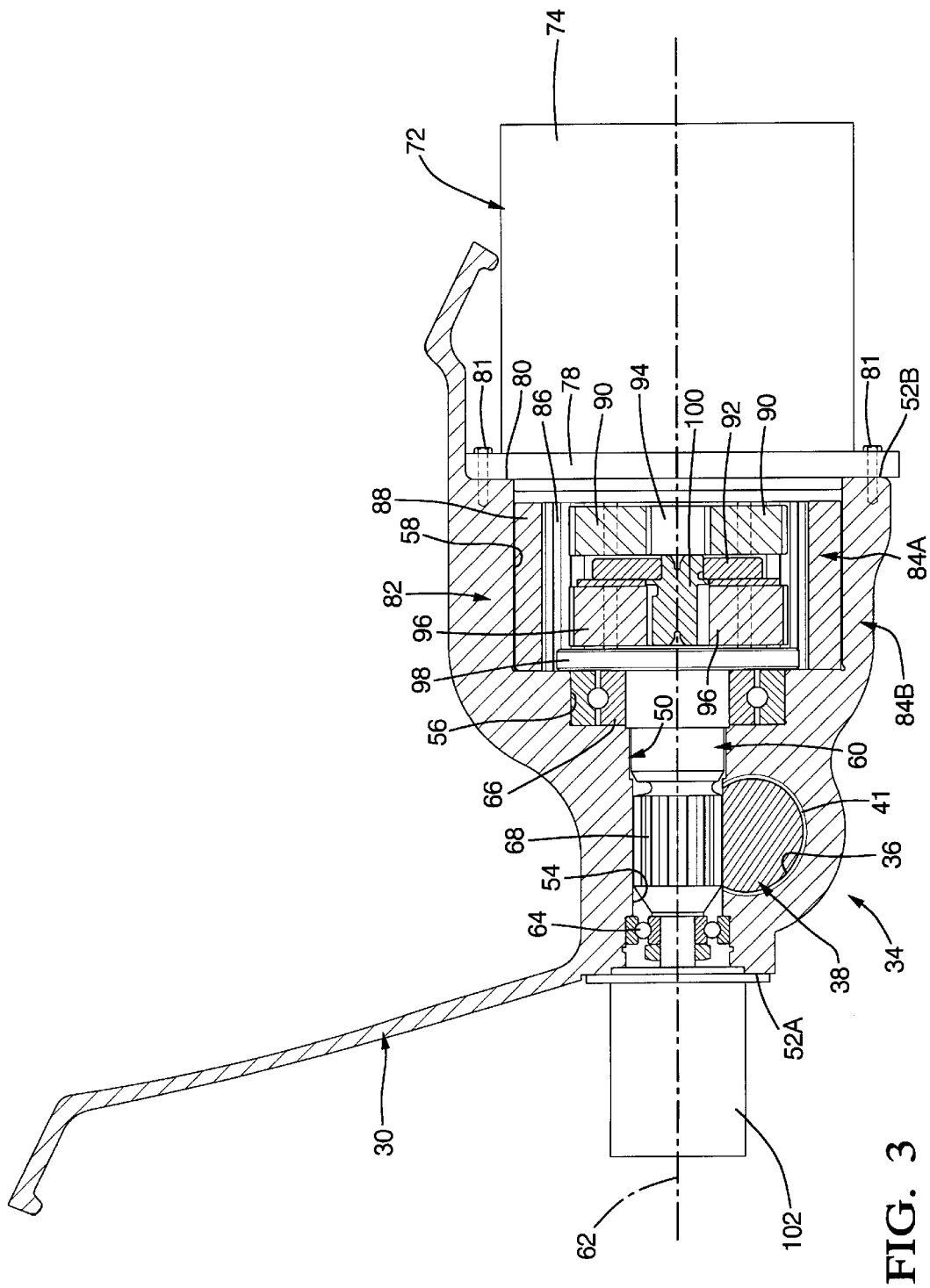
FIG. 3 is an enlarged sectional view taken generally along the plane indicated by lines 3—3 in FIG. 1.

The electrically-powered steering apparatus 34 on the differential cover 30 further includes a stepped bore 50, FIG. 3, in the cover between a pair of outside surfaces 52A, 52B of the latter. The stepped bore 50 has a pinion bore portion 54 intersecting the rack bar passage 36, a bearing seat portion 56, and a speed reducer housing portion 58. A pinion head 60 of the electrically-powered steering apparatus 34 is supported in the pinion bore portion 54 of the stepped bore 50 for rotation about a centerline 62 of the stepped bore by a first bearing 64 at one end of the pinion bore portion and a second bearing 66 in the bearing seat portion 56. A schematically-represented pinion gear 68 on the pinion head 60 cooperates with a rack gear 70 on the rack bar 38 in converting rotation of the pinion head about the centerline 62 of the stepped bore into back and forth linear translation of the rack bar in the rack bar passage 36. Flexure of the rack bar 38 in the aforesaid leaf spring fashion between the sleeve bearings 40 resiliently biases the rack gear 70 against the pinion gear 68 to eliminate lash therebetween.

Figure 5:
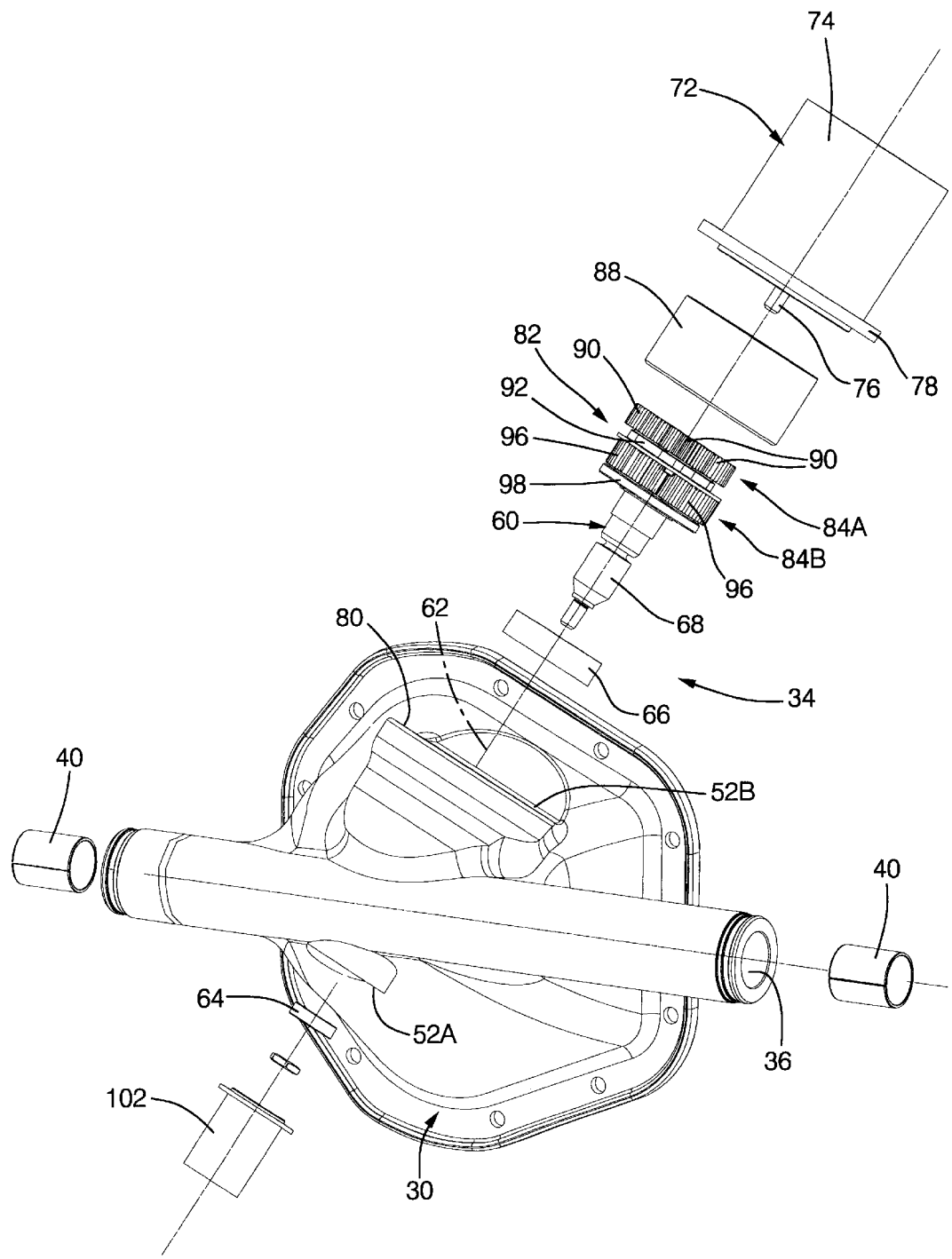
FIG. 5 is a fragmentary, exploded perspective view of the differential housing cover of the steerable drive axle according to this invention and of an electrically-powered steering apparatus on the differential cover.

As seen best in FIGS. 1, 3 and 5, a schematically-represented electric motor 72 of the electrically-powered steering apparatus 34 includes a structural housing 74 and an output shaft 76 rotatable in opposite directions. An annular flange 78 on the structural housing 74 seats against and is rigidly fastened to an annular seat 80 on the outside surface 52B of the differential cover 30 around the speed reducer housing portion 58 of the stepped bore by a plurality of schematically-represented fasteners 81 with the centerline of the motor coincident with the centerline 62 of the stepped bore 50.

A speed reducer 82 of the electrically-powered steering apparatus 34 includes a pair of planetary gear sets 84A, 84B in the speed reducer housing portion 58 of the stepped bore 50 arranged to afford two-stage torque multiplication between the output shaft 76 of the electric motor and the pinion head 60. The planetary gear sets 84A, 84B have a common ring gear 86 formed on an inner surface of a cylindrical sleeve 88 interference fitted in the speed reducer housing portion of the stepped bore. A plurality of planet gears 90 of the planetary set 84A are rotatably supported on a first stage planet carrier 92 and mesh concurrently with the ring gear 86 and a sun gear 94 of the planetary gear set 84A rotatable as unit with the output shaft 76 of the electric motor 72. A plurality of planet gears 96 of the planetary gear set 84B are rotatably supported on a second stage planet carrier 98 rotatable as a unit with the pinion head 60 and mesh concurrently with the ring gear 86 and with a sun gear 100 of the planetary gear set 84B rotatable as unit with planet carrier 92 of the planetary gear set 84A.

In operation, when a control module, not shown, of the motor vehicle turns the electric motor 72 on, torque is transferred from the output shaft 76 of the electric motor to the pinion head 60 through the speed reducer 82 to rotate the pinion head. The pinion gear 68 on the pinion head cooperates with the rack gear 70 on the rack bar 38 to concurrently induce linear translation of the rack bar in the rack bar passage 36 in a direction corresponding to the direction of rotation of the pinion head. The tie rods 42A, 42B cooperate with the lever arms 46, 48 to concurrently pivot the steering knuckles 24A, 24B about the steering axes 22A, 22B whereby the dirigible wheels at the ends of the rigid tubular housing 12 are steered by the electric motor. A position sensor 102 on the outside surface 52A of the differential cover 30 is connected to the pinion head 60 and provides an electronic signal to the aforesaid control module corresponding to the position of the rack bar 38.

We claim:

1. A steerable drive axle for a motor vehicle comprising:
   a rigid tubular housing,
   an expanded chamber in said rigid tubular housing for a differential gear set having an open side for affording access to said differential gear set,
   a pair of steering knuckles supported on said rigid tubular housing at respective ones of a pair of opposite ends thereof for pivotal movement about respective ones of a pair of steering axes of said rigid tubular housing,
   a differential cover rigidly attached to said rigid tubular housing over said open side of said expanded chamber,
   a rack bar passage in said differential cover,
   a rack bar having a rack gear thereon supported in said rack bar passage for back and forth linear translation in the length direction of said rack bar passage,
   a linkage means between said rack bar and each of said pair of steering knuckles operative in response to linear translation of said rack bar in said rack bar passage to pivot said steering knuckles in unison about corresponding ones of said pair of steering axes,
   a pinion head having a pinion gear thereon,
   an electric motor having a rotatable output shaft,
   a speed reducer means, and
   means operative to support each of said pinion head and said electric motor and said speed reducer means on said differential cover with said pinion gear meshing with said rack gear so that rotation of said pinion head induces linear translation of said rack bar and with said speed reducer means connected to each of said pinion head and said output shaft of said electric motor for transferring output torque of said electric motor to said pinion head.

2. The steerable drive axle for a motor vehicle recited in claim 1 further comprising:
   a pair of sleeve bearings on said differential cover on opposite sides of said pinion gear operative to support said rack bar in said rack bar passage for back and forth linear translation in said rack bar passage with clearance between said rack bar passage and said rack bar to accommodate resilient flexure of said rack bar in leaf spring fashion between said sleeve bearings whereby said rack gear is resiliently biased against said pinion gear.

3. The steerable drive axle for a motor vehicle recited in claim 1 wherein said speed reducer means comprises:
   a first planetary gear set including;
      a first ring gear rigidly attached to said differential cover,
      a plurality of first planet gears rotatably supported on a first planet carrier each meshing with said first ring gear, and
      a first sun gear rotatable as a unit with said output shaft of said electric motor meshing with each of said first planet gears; and
   a second planetary gear set including;
      a second ring gear rigidly attached to said differential cover,
      a plurality of second planet gears rotatably supported on a second planet carrier rotatable as a unit with said pinion head each meshing with said second ring gear, and
      a second sun gear rotatable as a unit with said first planet carrier meshing with each of said second planet gears.

4. The steerable drive axle for a motor vehicle recited in claim 3 wherein said means operative to support each of said pinion head and said electric motor and said speed reducer means on said differential cover comprises:
   a stepped bore in said differential cover having a pinion bore portion intersecting said rack bar passage and a speed reducer housing portion, a pair of anti-friction bearings between said differential cover and said pinion head rotatably supporting said pinion head in said pinion bore portion of said stepped bore, said speed reducer being disposed in said speed reducer housing portion of said stepped bore, and a flange on a structural housing of said electric motor seated on and rigidly attached to said differential cover at an annular seat on an outside surface of said differential cover around said speed reducing housing portion of said stepped bore.

5. The steerable drive axle for a motor vehicle recited in claim 4 wherein:

said first ring gear and said second ring gear are each formed on an inner surface of a cylindrical sleeve interference fitted in said speed reducerhousing portion of said stepped bore in said differential cover.

6. A steerable drive axle for a motor vehicle comprising:

a rigid tubular housing, an expanded chamber in said rigid tubular housing for a differential gear set having an open side for affording access to said differential gear set, a pair of steering knuckles supported on said rigid tubular housing at respective ones of a pair of opposite ends thereof for pivotal movement about respective ones of a pair of opposite ends thereof for pivotal movement about respective ones of a pair of steering axes of said rigid tubular housing, a differential cover rigidly attached to said rigid tubular housing over said open side of said expanded chamber, a rack bar passage integrated in said differential cover, a rack bar having a rack gear thereon supported in said rack bar passage for back and forth linear translation in the length direction of said rack bar passage, a linkage means between said rack bar and each of said pair of steering knuckles operative in response to linear translation of said rack bar in said rack bar passage to pivot said steering knuckles in unison about corresponding ones of said pair of steering axes, a pinion head having a pinion gear thereon, a controllable electric motor responsive to an external signal, and having a rotatable output shaft, a speed reducer having an input and an output, said input coupled to said rotatable output shaft and said output coupled to said pinion head;

wherein said controllable electric motor, in response to said external signal, rotates said output shaft driving said speed reducer input; said speed reducer output driving said pinion head, causing said rack bar linear translation, causing said steering knuckles to move in said unison;

wherein said controllable electric motor is a sole control input to said steerable drive axle.

7. The steerable drive axle for a motor vehicle recited in claim 6 wherein said speed reducer is comprised of a two stage planetary gear system.

8. The steerable drive axle for a motor vehicle recited in claim 6 and further comprising:

a position sensor receiving a pinion head position;

whereby said position sensor transmits an electronic signal corresponding to said pinion head position.

9. The steerable drive axle for a motor vehicle recited in claim 8 wherein said position sensor is mounted on an outside surface of said differential cover.

* * * * *